US012763977B2

(12) United States Patent
Uretzky et al.

(10) Patent No.: US 12,763,977 B2
(45) Date of Patent: Oct. 13, 2026

(54) AUTHENTICATION FOR NETWORK-BASED VIRTUAL MACHINE REPLICATION

(71) Applicant: Hewlett Packard Enterprise Development LP, Spring, TX (US)

(72) Inventors: Omer Uretzky, Herzliya (IL); Gil Barash, Herzliya (IL); Bar-Hai Asulin, Herzliya (IL); Roi Romy, Herzliya (IL)

(73) Assignee: Hewlett Packard Enterprise Development LP, Spring, TX (US)

( * ) Notice: Subject to any disclaimer, the term of this patent is extended or adjusted under 35 U.S.C. 154(b) by 29 days.

(21) Appl. No.: 18/943,271

(22) Filed: Nov. 11, 2024

(65) Prior Publication Data

US 2026/0135716 A1 May 14, 2026

(51) Int. Cl.
*H04L 9/32* (2006.01)
*G06F 9/455* (2018.01)

(52) U.S. Cl.
CPC ........ *H04L 9/3268* (2013.01); *G06F 9/45558* (2013.01); *G06F 2009/45587* (2013.01); *G06F 2009/45595* (2013.01)

(58) Field of Classification Search
CPC ..... H04L 9/3263; H04L 9/3268; H04L 63/04; H04L 63/0428; H04L 63/0442; H04L 63/0823; G06F 9/45533; G06F 9/45558; G06F 2009/45562; G06F 2009/4557; G06F 2009/45587; G06F 2009/45595
See application file for complete search history.

(56) References Cited

U.S. PATENT DOCUMENTS 9,152,578 B1 * 10/2015 Saad .................. H04L 63/0428
9,256,498 B1 * 2/2016 Leibowitz ........... G06F 9/45558
9,268,648 B1 * 2/2016 Barash ................ G06F 11/1446
10,140,039 B1 * 11/2018 Baruch ............... G06F 11/2094
10,740,021 B1 * 8/2020 Patil ...................... G06F 9/4416
(Continued)

OTHER PUBLICATIONS

Reiser et al., "Hypervisor-Based Efficient Proactive Recovery" [Online], Oct. 29, 2007[Retrieved on: Jan. 31, 2026], SRDS2007, Retrieved from: < https://ieeexplore.ieee.org/stamp/stamp.jsp?tp=&arnumber=4365686 > (Year: 2007).*
(Continued)

*Primary Examiner* — Eric W Shepperd
(74) *Attorney, Agent, or Firm* — Trop, Pruner & Hu, P.C.

(57) ABSTRACT

A method and system for configuring a data change filter in a virtualized environment are provided. A data change filter is installed in a hypervisor of a virtualization host, where the hypervisor executes a virtual machine. The data change filter intercepts data change operations from the virtual machine. The hypervisor includes a certificate management service that stores a private certificate for the data change filter and a public certificate for a replication processing service. The data change filter retrieves the certificates from the certificate management service, establishes an authenticated network connection with the replication processing service using the certificates, and sends the intercepted data change operations to the replication processing service over the authenticated connection. The system enables secure replication of data changes in virtualized environments.

20 Claims, 9 Drawing Sheets

300

(56) References Cited

U.S. PATENT DOCUMENTS

| | | | | |
|---|---|---|---|---|
| 2007/0220319 | A1* | 9/2007 | Desai | G06F 11/1464 714/13 |
| 2010/0281273 | A1* | 11/2010 | Lee | F04B 33/00 713/193 |
| 2012/0054486 | A1* | 3/2012 | Lakkavalli | G06F 21/57 713/155 |
| 2014/0052877 | A1* | 2/2014 | Mao | H04L 61/5007 709/245 |
| 2015/0081994 | A1 | 3/2015 | Christopher et al. | |
| 2016/0323098 | A1* | 11/2016 | Bathen | G06F 9/45558 |
| 2017/0031783 | A1* | 2/2017 | Kedem | G06F 11/1471 |
| 2017/0116088 | A1 | 4/2017 | Anami et al. | |
| 2017/0295024 | A1* | 10/2017 | Lin | H04L 63/20 |
| 2018/0102904 | A1* | 4/2018 | Lin | G06F 9/45558 |
| 2023/0412375 | A1* | 12/2023 | Bisht | G06F 16/178 |

OTHER PUBLICATIONS

Decourcelle et al., “Fast VM Replication on Heterogeneous Hypervisors for Robust Fault Tolerance” [Online], Nov. 27, 2023 [Retrieved on: Jan. 31, 2026], , Retrieved from: < https://dl.acm.org/doi/pdf/10.1145/3590140.3592849 > (Year: 2023).*

Vavala et al., “Securing Passive Replication through Verification” [Online], Jan. 7, 2016 [Retrieved on: Jan. 31, 2026], SRDS2015, Retrieved from: < https://ieeexplore.ieee.org/stamp/stamp.jsp?tp=&arnumber=7371581&tag=1 > (Year: 2016).*

* cited by examiner

AUTHENTICATION FOR NETWORK-BASED VIRTUAL MACHINE REPLICATION

BACKGROUND

Virtualization technology allows multiple virtual machines to execute on a single physical host, improving resource utilization and flexibility in computing environments. These virtual machines function as independent systems, each with its own operating system and applications. By abstracting the hardware resources of a physical machine, virtualization enables the creation of multiple isolated virtual environments on a single physical server. This technology has revolutionized data centers and cloud computing, allowing for more efficient use of computing resources and greater scalability.

The concept of virtualization has gained significant traction in recent years due to advances in hardware and software capabilities. Modern virtualization platforms use a hypervisor, also known as a virtual machine monitor, to manage the allocation of physical resources to virtual machines. This layer of abstraction allows multiple operating systems and applications to share the same physical hardware without interfering with each other. Virtualization can be applied to various components of Information Technology (IT) infrastructure, including servers, storage, and networks, providing a foundation for flexible computing environments.

Virtualization offers numerous benefits to organizations, including reduced hardware costs, improved energy efficiency, and simplified IT management. It enables rapid provisioning of new virtual machines, facilitates easier testing and development environments, and supports legacy applications on modern hardware. Additionally, virtualization enhances business continuity by allowing for easier migration of virtual machines between physical hosts. In a virtualized infrastructure, data backup and disaster recovery are important to protect against data loss and system failures.

BRIEF DESCRIPTION OF THE DRAWINGS

For a more complete understanding of this disclosure, and advantages thereof, reference is now made to the following descriptions taken in conjunction with the accompanying drawings.

Corresponding numerals and symbols in the different figures generally refer to corresponding parts unless otherwise indicated.

DETAILED DESCRIPTION

Figure 1:
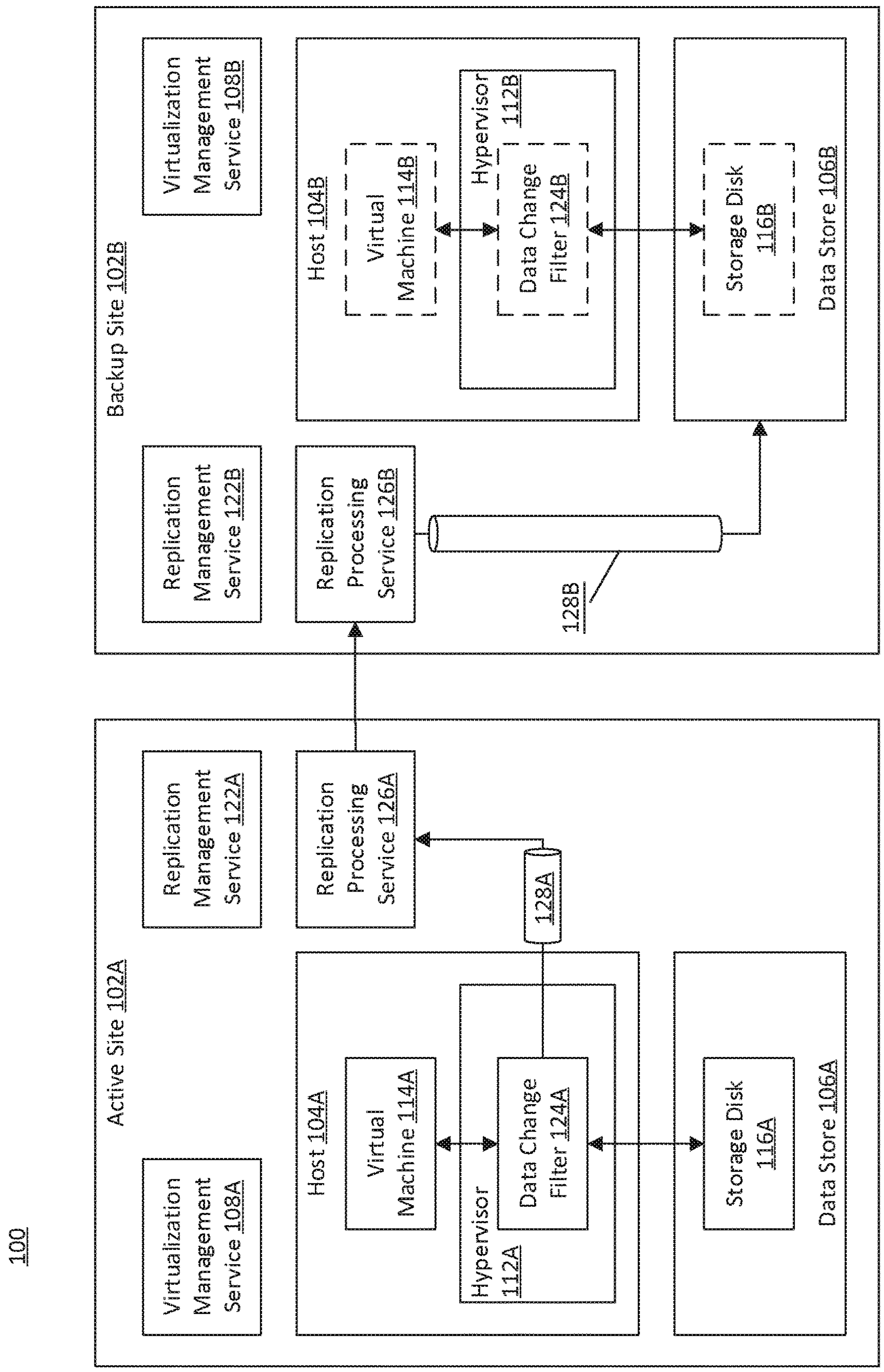
FIG. 1 is a block diagram of a virtualized environment, according to some implementations.

The following disclosure provides many different examples for implementing different features. Specific examples of components and arrangements are described below to simplify the present disclosure. These are, of course, merely examples and are not intended to be limiting.

Backup systems for virtualized environments often replicate virtual machines from one location to another for disaster recovery purposes. In one example, a backup system replicates a virtual machine by continuously capturing the data change operations made to the virtual machine and sending those data change operations to a backup site. Data change operations can be captured with a filter, which operates in the hypervisor of the virtualization host. This filter, also referred to as a data change filter, is a software component of the hypervisor that intercepts and copies the modifications made to the virtual machine's data. For example, the data change operations may be I/O operations, and the data change filter may be an input/output (I/O) filter that intercepts the I/O operations from the protected virtual machine. By operating within the hypervisor, the filter may capture data change operations with low impact on the virtual machine's performance. A replication processing service obtains the captured data change operations from the filter and handles the replication of those captured data change operations to the backup site. The data change operations may be received from the filter via any suitable communication channel, such as a network. A replication management service oversees the backup system, including the configuration and coordination of the data change filter and replication processing service.

One challenge in such backup systems is ensuring that the filter capturing the virtual machine's data change operations can authenticate the replication processing service. The data change filter operates at the hypervisor level and may access sensitive information from virtual machines. It needs to verify that it is sending data to a trusted replication processing service and not to a potentially malicious party. Without proper authentication between the data change filter and the replication processing service, there is a risk of sensitive data being sent to an unauthorized recipient. The backup system utilizes asymmetric cryptography to authenticate replication components. In asymmetric cryptography, the components use certificate pairs to communicate, where each component has a public and private certificate.

This disclosure describes a backup system that utilizes a multi-step process for setting up a protected virtual machine's data change filter. This process includes first installing the data change filter in the hypervisor of a virtualization host, and then providing certificates to the data change filter post-installation. The certificates may be used to establish a secure, authenticated network connection between the data change filter and a replication processing service. The replication management service installs a certificate management service on the virtualization host at the hypervisor level. This certificate management service is not accessible to the virtual machines, ensuring a high level of security. The replication management service loads certificates for authenticating the replication processing service onto this certificate management service. In some aspects, the replication management service may utilize asymmetric cryptography to securely provide the certificates to the certificate management service. These certificates include the public certificate of the replication processing service as well as the private certificate of the data change filter, which may be used to encrypt communications between the replication processing service and the data change filter during operation. The data change filter is not pre-configured with these certificates at the time of its installation. After the data change filter is installed, the filter retrieves those certificates from the certificate management service. Once the data change filter has retrieved the certificates, it uses them to establish a secure, authenticated network connection with the replication processing service.

Because they are both installed at the hypervisor level of the virtualization host, the data change filter may securely communicate with the certificate management service to obtain its certificates. In some implementations, the data change filter and the certificate management service communicate using a secure inter-process communication channel within the hypervisor. This approach allows a generic data change filter to be installed without pre-configuration, which is then customized post-installation with the necessary certificates, improving the overall security of the virtualization host.

FIG. 1 is a block diagram of a virtualized environment 100, according to some implementations. The virtualized environment 100 includes multiple sites 102, including an active site 102A and a backup site 102B. In some aspects, replication is utilized to create and maintain backup copies of data and systems from the active site 102A to the backup site 102B. This configuration provides data protection and disaster recovery capabilities, allowing for operational continuity at the backup site 102B in case of failures at the active site 102A.

The active site 102A serves as the primary operational environment within the virtualized environment 100. It includes various components that work together to support the execution of virtual machines, including a host 104A, a data store 106A, and a virtualization management service 108A. While only one instance of each component is shown, there may be multiple instances of each component.

The host 104A may be a physical server that provides the computational resources necessary to run virtual machines. Thus, the host 104A may be referred to as a virtualization host. It executes a hypervisor 112A that manages the allocation of hardware resources to a virtual machine 114A running on the host 104A. The host 104A may also include various components to support virtualization and system management. In some aspects, the host 104A may incorporate hardware-assisted virtualization technologies, such as Intel VT-x or AMD-V, to improve performance and security of the virtual machine 114A. The host 104A may be equipped with a high-performance processor, ample memory, and fast storage interfaces to efficiently execute multiple virtual machines concurrently. Additionally, the host 104A may feature a network interface with support for advanced capabilities like Single Root I/O Virtualization (SR-IOV) to provide dedicated network resources to the virtual machine 114A. In some cases, the host 104A may also include specialized hardware accelerators for tasks such as encryption or graphics processing, which can be shared among virtual machines to enhance their capabilities. The host 104A may support live migration capabilities, allowing virtual machines to be moved between physical hosts with minimal downtime. It may also implement resource pools and distributed resource scheduling to optimize workload distribution across multiple hosts in a cluster.

The data store 106A is a storage system that provides the underlying storage infrastructure for the host 104A. It may include one or more storage devices, such as hard disk drives, solid-state drives, storage area networks, or the like. The data store 106A may contain virtual machine disk files, configuration files, and other data necessary for the operation of the virtual machine 114A running on the host 104A. For example, the data store 106A may include a storage disk 116A (which may be a physical or virtual disk) for the virtual machine 114A. In some aspects, the data store 106A utilizes advanced storage technologies like thin provisioning or deduplication to optimize storage utilization. It may also implement tiered storage architectures, where frequently accessed data is stored on high-performance media while less frequently accessed data is moved to lower-cost storage tiers. The data store 106A may support various storage protocols, such as Network File System (NFS), Internet Small Computer System Interface (iSCSI), or Fibre Channel, to provide flexible connectivity options for the host 104A. In some cases, the data store 106A incorporates features like data compression or encryption to enhance data security and reduce storage footprint. The data store 106A may support capabilities that allow virtual machine disks to be migrated between different storage systems without interrupting the running virtual machines. It may also implement storage policies to automate the placement and management of virtual machine data based on performance, availability, and compliance requirements.

The virtualization management service 108A is responsible for overseeing and controlling the virtualized environment on the active site 102A. It provides a centralized interface for managing the host 104A (including the virtual machine 114A) and the data store 106A (including the storage disk 116A). The virtualization management service 108A may handle tasks such as virtual machine provisioning, resource allocation, monitoring, and maintenance. It may also offer capabilities for creating and managing virtual networks, configuring storage policies, and implementing security measures across the virtualized infrastructure. In some aspects, the virtualization management service 108A provides features for performance optimization, capacity planning, and automated workload balancing among hosts. Additionally, the virtualization management service 108A may offer APIs and plugins to extend its functionality and integrate with third-party management tools.

The virtualization management service 108A may be implemented in any desired manner to suit the needs of the virtualized environment 100. The virtualization management service 108A may be deployed on a physical host, as a virtual machine on a host, using containerization technologies, or the like. More generally, the virtualization management service 108A may be executed on a management host (not separately illustrated in FIG. 1), which may be a physical or virtual host.

The active site 102A incorporates a backup system to ensure data protection and disaster recovery capabilities. This system utilizes replication, which continuously captures and transmits data change operations from the active site 102A to the backup site 102B. The backup site 102B may be different from the active site 102A. Specifically, the sites may be at different physical locations (e.g., different geographic locations) or different logical locations (e.g., different parts of a network). By replicating data in near real-time, the backup system may maintain an up-to-date copy of information at the backup site 102B, allowing for rapid recovery in case of failures at the active site 102A. The backup system includes a replication management service 122A, a data change filter 124A, and a replication processing service 126A at the active site 102A, which work together to replicate data change operations to the backup site 102B.

The replication management service 122A oversees the replication process within the active site 102A. It configures, coordinates, and monitors the various components involved in data replication. The replication management service 122A may interact with the virtualization management service 108A to manage protection of the virtual machine 114A and to gather necessary configuration details. It also manages the deployment and configuration of replication components in the active site 102A.

The replication management service 122A may be implemented in any desired manner to suit the needs of the virtualized environment 100. The replication management service 122A may be deployed on a physical host, as a virtual machine on a host, using containerization technologies, or the like. More generally, the replication management service 122A may be executed on a management host (not separately illustrated in FIG. 1), which may be a physical or virtual host.

The data change filter 124A is a specialized component installed in the hypervisor 112A of the host 104A. In some aspects, a data change filter is installed within the hypervisor of each host for which replication is desired. Its primary function is to intercept and capture data change operations from the virtual machine 114A running on the host 104A. A data change operation may include any modification to data stored on or accessed by the virtual machine 114A, such as write operations. A data change operation may include an I/O operation for the storage disk 116A, which may be file-agnostic as it operates at the block level of storage, directly on raw storage blocks. In some implementations, a data change operation may include an offset (of the storage disk 116A) and binary data. Thus, the data change filter 124A operates at a low level (e.g., closer to the storage disk 116A than applications accessing the storage disk 116A), intercepting data change operations from the virtual machine 114A before they reach the corresponding storage disk 116A. In some implementations, the filter intercepts these operations asynchronously, allowing the original data change operation to proceed to the storage disk 116A without blocking or delaying it. This asynchronous interception enables the filter to capture data change operations without impacting the performance of the virtual machine 114A. The data change operations will be subsequently replicated to the backup site 102B. Continuously capturing and replicating these data change operations may allow for nearly real-time data protection, with only a minimal delay between when changes occur on the protected virtual machine 114A and when they are replicated to the backup site 102B.

The data change filter 124A is integrated into the I/O stack of the hypervisor 112A, functioning as a virtual I/O adapter that intercepts and captures data change operations from a virtual machine 114A at the block level. It may utilize networking communications (e.g., a Transmission Control Protocol/Internet Protocol (TCP/IP)-based communication protocol) to transmit captured data change operations to services that are external to the hypervisor 112A, working asynchronously to capture I/O operations without significantly impacting the performance of the virtual machine 114A. The data change filter 124A intercepts write operations, including storage offset and binary data information, on the way to the virtual machine's storage disk. In some implementations, it includes capabilities for data compression, batching, ensuring data integrity, and/or managing operation sequencing to maintain consistency in replicated data. The data change filter 124A runs in the user space of the hypervisor 112A instead of its kernel space, which may improve stability of the host 104A. This user space implementation may allow for easier updates and maintenance of the data change filter 124A without requiring changes to the core components of the hypervisor 112A.

The replication processing service 126A is responsible for processing and transmitting the data change operations captured from the virtual machine 114A to the backup site 102B. It may receive data change operations from the data change filter 124A, potentially across hosts. The replication processing service 126A may perform various tasks such as data compression, deduplication, and encryption before transmitting the changes over a network to the backup site 102B. It may also manage the sequencing and integrity of the replicated data to ensure consistency at the backup site 102B. In some aspects, the replication processing service 126A implements intelligent batching algorithms to optimize network usage and reduce latency. That is, the replication processing service 126A may aggregate the data change operations from the data change filter 124A and then batch them for sending to the backup site 102B, potentially at a configurable interval. For example, the replication processing service 126A may batch data change operations for 5 seconds before transmitting them to the backup site 102B. This allows administrators to configure a balance between replication frequency and network efficiency based on their specific requirements and network conditions. In some aspects, the replication processing service 126A replicates the data change operations without aggregation, which may allow for faster replication.

The replication processing service 126A may be implemented in any desired manner to suit the needs of the virtualized environment 100. The replication processing service 126A may be deployed on a physical host, as a virtual machine on a host, as a Virtual Replication Appliance (VRA) on a host, using containerization technologies, or the like. More generally, the replication processing service 126A may be executed on a replication host (not separately illustrated in FIG. 1), which may be a physical or virtual host.

The components of the active site 102A (including the host 104A and associated services) may be interconnected over any suitable type of network, including a local area network (LAN), a wide area network (WAN), the internet, a high-speed interconnect like InfiniBand, or the like. In some implementations, these network connections may utilize dedicated high-speed links between components to ensure low-latency and high-bandwidth communication for efficient data replication. The network infrastructure may include routers, switches, and firewalls configured to prioritize and secure the traffic between the data change filter 124A and the replication processing service 126A. The network infrastructure may also include virtual networking components provided by the hypervisor 112A. The network may support quality of service (QoS) mechanisms to prioritize or deprioritize replication traffic based on replication requirements and network conditions. In some cases, the network may leverage specialized protocols or optimizations designed for low-latency, high-throughput data transfer between components in the virtualized environment 100.

The replication processing service 126A is separate from the data change filter 124A. This separation allows for flexible deployment options and improved resource utilization. The replication processing service 126A may be executed on a dedicated replication host, which may be physical or virtual. The data change filter 124A and the replication processing service 126A may communicate over the network of the active site 102A, enabling them to operate on separate hosts. This network-based communication allows for various deployment scenarios, such as having multiple data change filters 124A on different virtualization hosts sending data to a replication processing service 126A on a single replication host. In some implementations, the replication processing service 126A replicates changes from multiple data change filters 124A to the backup site 102B.

The data change filter 124A may be connected to the replication processing service 126A through a network connection 128A, which may be a connection in the network of the active site 102A. This network connection 128A allows the data change filter 124A to transmit intercepted data change operations to the replication processing service 126A for processing and replication. Due to the network connection 128A, there is separation between the virtual machine 114A and the replication processing service 126A, with the data change filter 124A acting as an intermediary for data replication across the virtualization and replication hosts. As a result, the replication processing service 126A may run on a different host than the data change filter 124A.

The network connection 128A between the data change filter 124A and the replication processing service 126A may utilize a TCP/IP-based protocol optimized for low-latency, high-throughput data transfer. This protocol may implement a custom application layer designed specifically for efficient transmission of data change operations. The protocol may include features such as message framing, sequence numbering, and acknowledgment mechanisms to ensure reliable delivery of data change operations to the replication processing service 126A. Additionally, the protocol may support delta encoding, where only the differences between consecutive operations are transmitted, further reducing the amount of data sent over the network. The protocol may support connection pooling, allowing multiple logical streams of data change operations to be multiplexed over a single connection.

The network connection 128A may employ data compression techniques to reduce bandwidth usage. For example, the data change filter 124A may apply lossless compression algorithms such as LZ4 or Zstandard to the intercepted data change operations before transmission to the replication processing service 126A. The compression level may be configurable, and may be set by an administrator based on the desired compression efficiency and processing overhead.

The network connection 128A may employ security measures to protect the transmitted data. This may include using Transport Layer Security (TLS) for encryption and authentication, potentially using hardware-accelerated encryption on supported platforms. The protocol may implement a handshake process that includes mutual authentication between the data change filter 124A and the replication processing service 126A, using pre-shared certificates. This authentication process may utilize public/private certificate pairs, such as certificate pairs that are generated by a service or system administrator. The use of these certificate pairs may allow for verifying the identity of both the sender and receiver of data change operations.

The aforementioned hosts (e.g., virtualization hosts, replication hosts, and management hosts) may include suitable components for performing any desired functionality. One or more modules within the hosts may be partially or wholly embodied as software and/or hardware for performing any functionality described herein. For example, a host may include a processor and a memory. The processor may be a microprocessor, an application-specific integrated circuit, a microcontroller, or the like. The memory may be a non-transitory computer readable medium that stores instructions for execution by the processor. The instructions, when executed by the processor, cause the processor to perform any functionality described herein.

The backup site 102B has similar components to the active site 102A but may be located at a different physical or logical location. It includes a host 104B, a data store 106B, a virtualization management service 108B, a hypervisor 112B, a virtual machine 114B, a storage disk 116B, a replication management service 122B, a data change filter 124B, a replication processing service 126B, and a network connection 128B, which may have similar functionality and be implemented in a similar manner as their counterparts at the active site 102A. While only one instance of each component is shown, there may be multiple instances of each component.

The backup site 102B is primarily used for replication and failover purposes, serving as a destination for data backed up from the active site 102A. In some cases, the backup site 102B remains in a standby state during normal operations, ready to take over in case of failures or disasters at the active site. The replication process between the active site 102A and the backup site 102B is managed by the replication management services 122A, 122B.

The replication processing service 126B is separate from the data change filter 124B. This separation allows for flexible failover operations, such as having multiple data change filters 124B on different virtualization hosts be managed by a replication processing service 126B on a single replication host.

In a replication flow for a virtual machine 114A, the data change filter 124A intercepts data change operations made by the virtual machine 114A to its storage disk 116A. These intercepted data change operations are then sent, by the data change filter 124A, to the replication processing service 126A. The replication processing service 126A processes the data change operations, replicating them to the corresponding replication processing service 126B at the backup site 102B. For example, the data change operations may be sent from the replication processing service 126A to the replication processing service 126B over a network connection. Upon receiving the replicated data change operations, the replication processing service 126B stores them in a journal, which may be located on the data store 106B at the backup site 102B. This journaling approach may allow for point-in-time recovery and provides a detailed record of all data change operations from the storage disk 116A, potentially enabling more granular restore options.

In a failover flow for a virtual machine 114A, the backup site 102B takes over operations from the active site 102A. The replication processing service 126B accesses the journal stored on the data store 106B to recover the data for the virtual machine 114A to a desired point in time. The recovered data is used to recreate a storage disk 116B in the data store 106B. A new virtual machine 114B is created on the host 104B at the backup site 102B, along with a corresponding data change filter 124B. This new virtual machine 114B is configured to use the recreated storage disk 116B, effectively becoming a replica of the original virtual machine 114A.

In some aspects, the storage disk 116B may be initially created as an empty disk so the virtual machine 114B may begin running quickly. Before the storage disk 116B is filled with restored data, the data change filter 124B may fetch needed data for the virtual machine 114B. Specifically, the data change filter 124B may forward a request for data from the virtual machine 114B to the replication processing service 126B, which may fetch the requested data from the journal and provide it to the data change filter 124B. Once the new virtual machine 114B is operational, the data change filter 124B captures new data change operations to the storage disk 116B. These new data change operations may be sent to the replication processing service 126B for further replication. The data change filter 124B may capture the new data change operations asynchronously or synchronously, depending on whether the storage disk 116B has been rebuilt. In some implementations, the data change filter 124B may capture the new data change operations synchronously during rebuilding of the storage disk 116B, temporarily blocking operations from proceeding to the storage disk 116B until relevant data of the storage disk 116B has been retrieved from the journal.

The data change filter 124A operates at the hypervisor level of the host 104A and may access sensitive information from the virtual machine 114A. Because of this, it needs to verify that it is sending data to a trusted replication processing service 126A and not to a potentially malicious party. To ensure data integrity, the data change filter 124A and the replication processing service 126A authenticate during operation, before they begin exchanging data. The authentication uses pre-shared certificates.

The setup of the data change filter 124A and the replication processing service 126A involves a two-step process to enhance security and flexibility in the virtualized environment 100. In the first step, the data change filter 124A is installed in the hypervisor 112A of the host 104A using a standard installation package. This initial installation may be performed without pre-configuring the filter with specific authentication certificates, allowing for easier updates or changes to the filter. Additionally, this approach may allow the filter's executable code to be signed at its build stage, potentially by a third party, which may improve deployment security. In the second step, which occurs after the installation, the data change filter 124A is configured to establish authenticated communication with the replication processing service 126A. This post-installation authentication setup may involve retrieving necessary certificates from a secure source within the hypervisor 112A of the host 104A. By separating the installation and authentication configuration steps, the system may provide greater adaptability in managing authentication certificates between the data change filter 124A and the replication processing service 126A. This approach allows for a standardized installation process while still maintaining the ability to securely authenticate components, helping to prevent unauthorized access to sensitive data.

FIGS. 2A-2F are block diagrams of intermediate steps in a setup process for a data change filter 124, according to some implementations. In this configuration, a replication processing service 126 is deployed on the same host 104 as a virtual machine 114 that will be backed up by the replication processing service 126. Thus, the hypervisor 112 of the host 104 executes both the replication processing service 126 and the virtual machine 114. In another configuration, the virtual machine 114 and the replication processing service 126 may be deployed on separate hosts and executed by separate hypervisors.

Figure 2A:
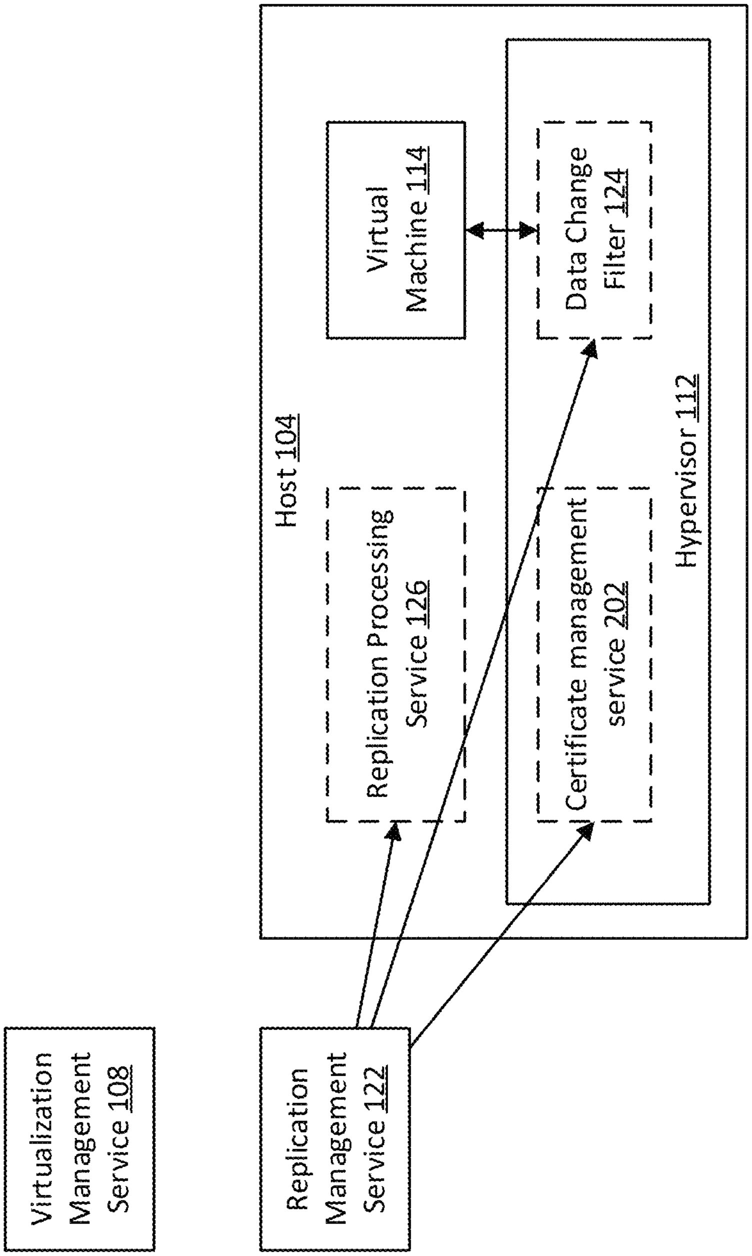
FIGS. 2A-2F are block diagrams of intermediate steps in a setup process for a data change filter, according to some implementations.

In FIG. 2A, a certificate management service 202 is installed in the hypervisor 112 of the host 104. The data change filter 124 for the virtual machine 114 is also installed in the hypervisor 112. Furthermore, the replication processing service 126 is configured to execute on the hypervisor 112. In some aspects, these components may be installed or set up by the replication management service 122, as indicated by dashed lines in the figure. The replication management service 122 may coordinate the installation and configuration of these components to enable secure data replication in the virtualized environment.

The certificate management service 202 may be responsible for managing digital certificates used for authentication and secure communication within the virtualized environment. It may store and provide certificates to other components as needed. Specifically, the certificate management service 202 securely stores certificates for the data change filter 124 and provides them to the data change filter 124 when needed. Those certificates will be used by the data change filter 124 to authenticate the replication processing service 126 during operation (e.g., during replication). The certificate management service 202 may be implemented as a module within the hypervisor 112, logically isolated from the virtual machine 114 to enhance security. In some aspects, isolation may be achieved by executing the certificate management service 202 in a privileged domain or component of the hypervisor 112, which is separated from the virtual machine 114 through various mechanisms. These mechanisms may include memory isolation, hardware-assisted virtualization features, access controls, and the like, depending on the architecture and configuration of the hypervisor 112. In some aspects, the certificate management service 202 may utilize secure storage for storing sensitive information, e.g., authentication certificates. The certificate management service 202 may support various certificate formats and cryptographic algorithms to accommodate different security requirements. It may also provide certificate lifecycle management functions such as certificate renewal, revocation, and rotation.

In some implementations, the certificate management service 202 may include a process executing in the hypervisor 112 as well as an interface for accessing the service. The interface may provide programmatic access for external components to interact with and store certificates on the certificate management service 202. For example, the programmatic interface may be an API (potentially implemented with a web server), a remote procedure call (RPC) interface, or another suitable mechanism. The process executing in the hypervisor 112 may be a daemon running continuously to handle certificate operations. In some aspects, this process could be implemented as a kernel module or a user-space application, depending on the architecture of the hypervisor 112. The data change filter 124 may communicate with this process (of the certificate management service 202) to retrieve certificates as needed. In other implementations, the certificate management service 202 may have different architectures or components to suit various virtualization environments and security requirements.

The data change filter 124 may be installed as part of the process of setting up replication for the virtual machine 114. In some cases, this installation may occur when the virtual machine 114 is initially configured for replication. The data change filter 124 may be automatically or manually deployed by the replication management service 122 when a user or administrator initiates the replication setup process for the virtual machine 114. In some implementations, the installation of the data change filter 124 may involve configuring the I/O stack of the hypervisor 112 to intercept data change operations from the virtual machine 114.

The replication processing service 126 may be configured when setting up replication for the virtualized environment. This configuration process may involve specifying replication parameters such as replication targets, schedules, and data retention policies. The replication processing service 126 may be automatically deployed by the replication management service 122 or manually deployed by a system administrator.

The installation order of the replication components may be flexible. In some implementations, the data change filter 124 may be installed before the certificate management service 202. In some implementations, the data change filter 124 may be installed after the certificate management service 202. The specific order of installation may depend on factors such as the system architecture, administrative preferences, or specific requirements of the virtualized environment.

Figure 2B:
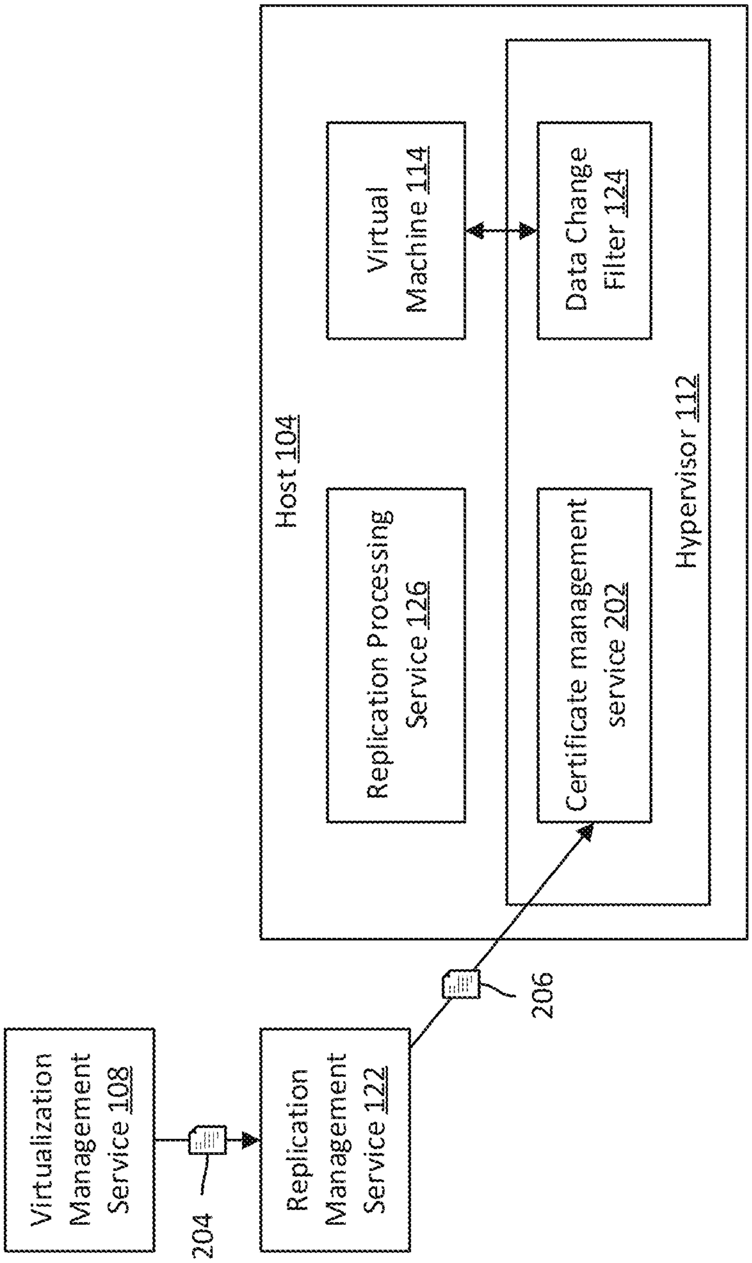

In FIG. 2B, the replication management service 122 obtains a virtualization management certificate 204 from the virtualization management service 108. The virtualization management certificate 204 may be used to establish an authenticated connection between the replication management service 122 and the certificate management service 202, such as when the certificate management service 202 is implemented as a module within the hypervisor 112. The virtualization management certificate 204 may include cryptographic information such as a public key, a private key, or both. In some implementations, the certificate may contain additional metadata such as an expiration date, issuer information, and usage restrictions. The certificate may be formatted according to a standard like X.509 or the like. In some aspects, the replication management service 122 may obtain the virtualization management certificate 204 through a programmatic interface of the virtualization management service 108, such as an API, an RPC interface, or the like. Optionally, the certificate management service 202, being part of the hypervisor 112, may access the hypervisor's cryptographic key (for the host 104) and utilize it to authenticate the virtualization management certificate 204 obtained from the virtualization management service 108.

The replication management service 122 may provide data change filter certificates 206 to the certificate management service 202 over the authenticated connection established using the virtualization management certificate 204. The data change filter certificates 206 may include a certificate pair which will be used by the data change filter 124 to establish an authenticated connection with the replication processing service 126 during operation. Specifically, the data change filter certificates 206 may include a public certificate for the replication processing service 126 and a private certificate for the data change filter 124. The data change filter 124 may use its private certificate to encrypt requests to the replication processing service 126, while the data change filter 124 may use the public certificate of the replication processing service 126 to decrypt requests from the replication processing service 126. The public and private certificates may be generated by the replication management service 122, the virtualization management service 108, another suitable service, or a system administrator. The data change filter certificates 206 may each include cryptographic information such as a public key, a private key, or both. In some implementations, the certificates may contain additional metadata such as an expiration date, issuer information, and usage restrictions. The certificates may be formatted according to a standard like X.509 or the like.

The certificate management service 202 store the data change filter certificates 206 in a secure location. For example, the certificates may be stored in a file on the hypervisor 112. In some implementations, the certificate management service 202 may store the certificates in a dedicated secure storage area within the hypervisor 112. In some implementations, the certificates may be stored in an encrypted database managed by the certificate management service 202. In some implementations, the certificate management service 202 may utilize hardware-based secure storage, such as a trusted platform module (TPM), to store sensitive certificate information. The specific storage location and security measures may be configurable based on the security requirements of the virtualized environment.

When the certificate management service 202 includes the aforementioned process and programmatic interface, the data change filter certificates 206 may be provided to the certificate management service 202 programmatically via the interface. The process may receive the certificates and store them in a secure location accessible to the process. The process may then retrieve the certificates from that secure location in the future when needed. Thus, the interface may handle the initial secure storage of certificates, while the process may handle the subsequent retrieval of the certificates as needed.

Figure 2C:
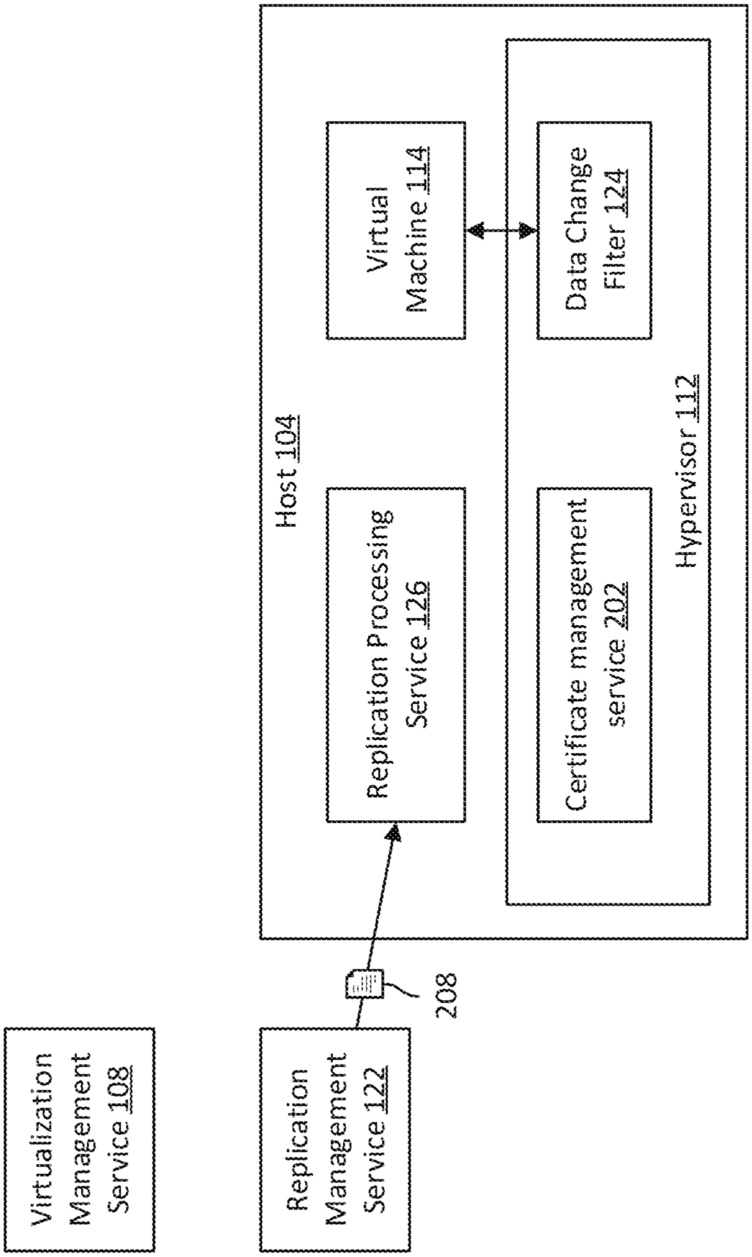

In FIG. 2C, the replication management service 122 provides one or more replication processing service certificates 208 to the replication processing service 126. The replication processing service certificates 208 may include a certificate pair which will be used by the replication processing service 126 to establish an authenticated connection with the data change filter 124 during operation. Specifically, the replication processing service certificates 208 may include a public certificate for the data change filter 124 and a private certificate for the replication processing service 126. The replication processing service 126 may use its private certificate to encrypt requests to the data change filter 124, while replication processing service 126 may use the public certificate of the data change filter 124 to decrypt requests from the data change filter 124. The public and private certificates may be generated by the replication management service 122, the virtualization management service 108, another suitable service, or a system administrator. The replication processing service certificates 208 may each include cryptographic information such as a public key, a private key, or both. In some implementations, the certificates may contain additional metadata such as an expiration date, issuer information, and usage restrictions. The certificates may be formatted according to a standard like X.509 or the like.

In some implementations, the private certificate for the replication processing service 126 may be included as part of the installation package for the replication processing service 126, rather than being sent to the replication processing service 126 separately after its installation. For example, when the replication processing service 126 is implemented as a Virtual Replication Appliance (VRA), its private certificate may be bundled with the VRA's files. In this case, the replication management service 122 may provide the public certificate of the data change filter 124 to the replication processing service 126 after installation, while the replication processing service 126 may already have its own private certificate. More particularly, both a public and private certificate for the replication processing service 126 may be generated; the private certificate may be bundled with the replication processing service 126 in the step of FIG. 2A while the public certificate may be provided to the certificate management service 202 in the step of FIG. 2B. Likewise, both a public and private certificate for the data change filter 124 may be generated; the private certificate may be provided to the certificate management service 202 in the step of FIG. 2B while the public certificate may be provided to the replication processing service 126 in the step of FIG. 2C.

Figure 2D:
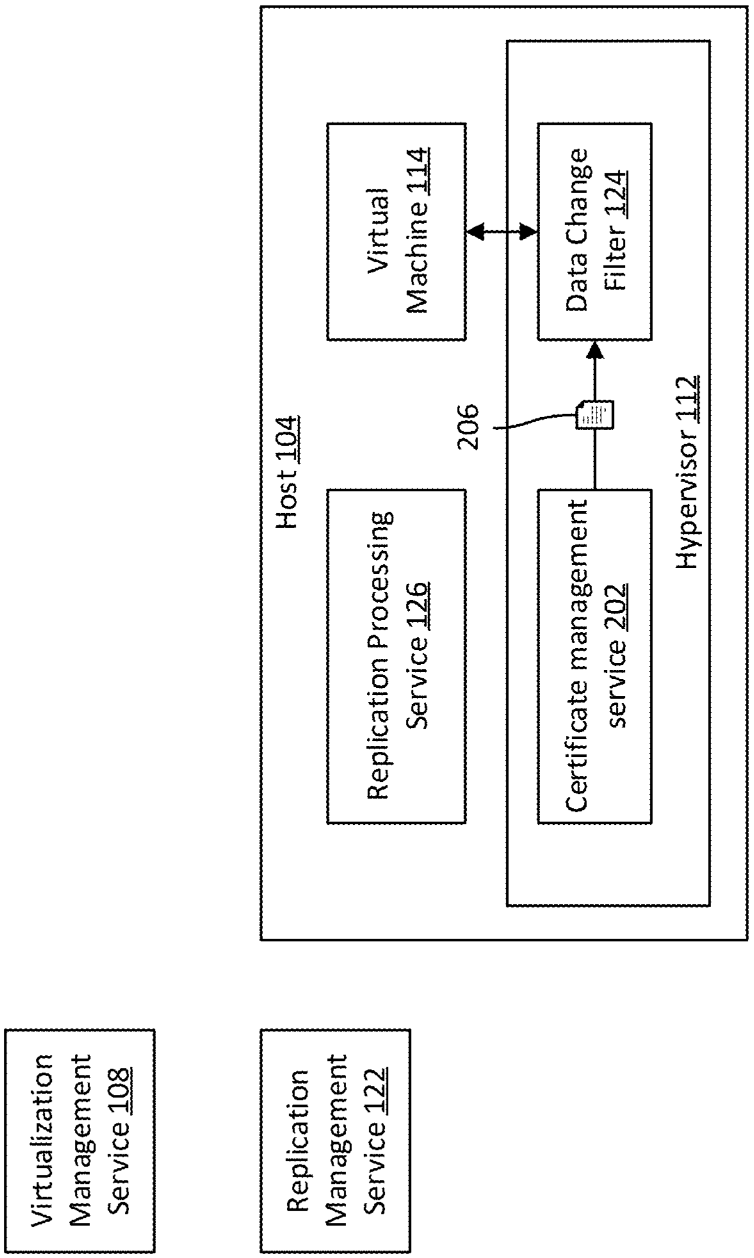

In FIG. 2D, the data change filter 124 obtains the data change filter certificates 206 from the certificate management service 202. Specifically, the data change filter 124 obtains its own private certificate as well as the public certificate of the replication processing service 126. This occurs after the data change filter 124 has been installed, allowing the data change filter 124 package to be standardized. The post-installation configuration of the data change filter certificates 206 may also enable flexibility in deploying and updating the data change filter 124. This may allow administrators to manage certificates separately from the filter installation, potentially simplifying certificate lifecycle management functions.

The data change filter 124 may obtain the data change filter certificates 206 from the certificate management service 202 through a secure mechanism. In some aspects, this may occur via a secure inter-process communication channel, such as a Unix socket. The data change filter 124 may include a first process executing in the hypervisor 112, the certificate management service 202 may include a second process executing in the hypervisor 112, and the data change filter certificates 206 may be provided to the data change filter 124 by sending the data change filter certificates 206 from the second process (of the certificate management service 202) to the first process (of the data change filter 124) via inter-process communication. Secure transfer may be facilitated by the fact that both the certificate management service 202 and the data change filter 124 include processes executing within the hypervisor 112. In some implementations, the certificate management service 202 may store the certificates in a secure file on the hypervisor 112. In such implementations, when the data change filter 124 connects to the certificate management service 202 via an inter-process communication channel, the certificate management service 202 may provide the certificates from the secure file to the data change filter 124. Subsequently, the data change filter 124 may use the obtained certificates to establish an authenticated network connection with the replication processing service 126.

Figure 2E:
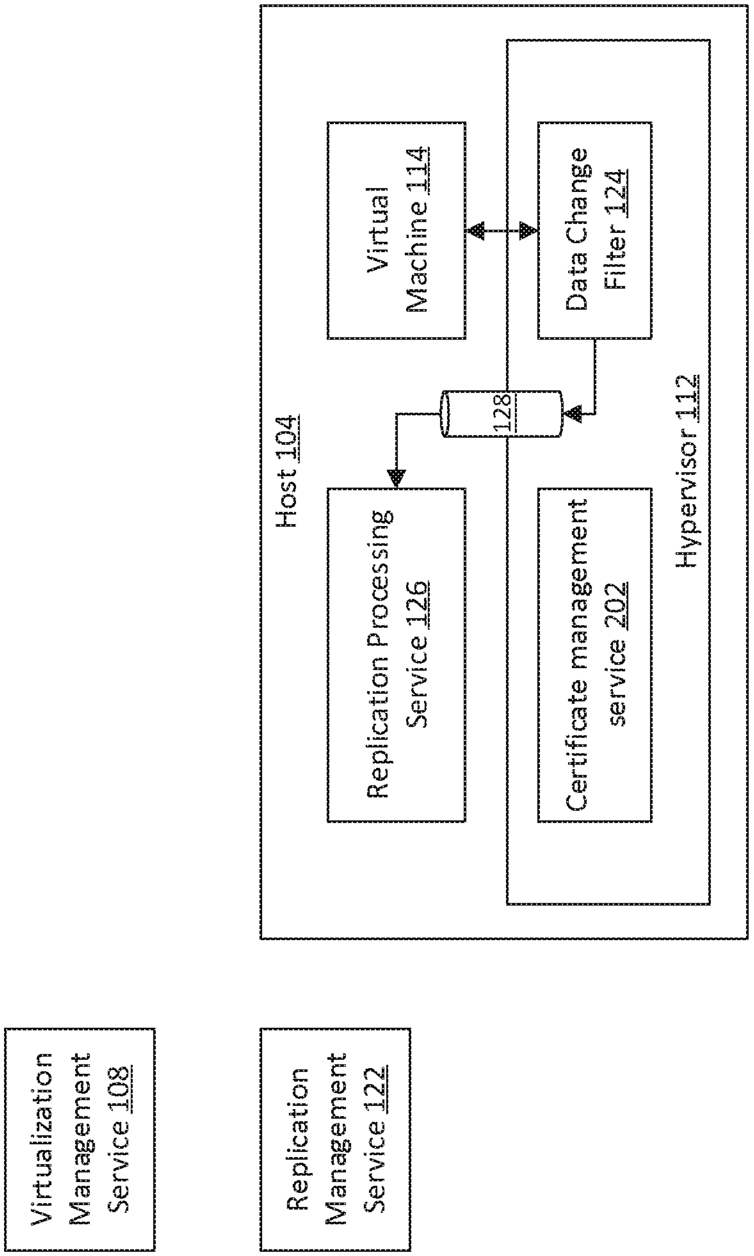

In FIG. 2E, the data change filter 124 establishes an authenticated network connection 128 with the replication processing service 126 using the data change filter certificates 206 (e.g., the private and public certificates) obtained from the certificate management service 202. The authenticated network connection 128 may be used for secure data transmission between the two components. The host 104 may be configured to establish the authenticated network connection 128 by asymmetrically encrypting communications. The data change filter 124 uses its private certificate to encrypt outgoing communications and the public certificate of the replication processing service 126 to decrypt incoming communications. Conversely, the replication processing service 126 uses its own private certificate to encrypt its outgoing communications and the public certificate of the data change filter 124 to decrypt incoming communications. This mutual authentication ensures that both components can verify each other's identity, preventing unauthorized access to sensitive data (e.g., data change operations of the virtual machine 114). Once this secure connection is established, the data change filter 124 can begin intercepting data change operations from the virtual machine 114 and safely transmitting them to the replication processing service 126 for further processing and replication to the backup site.

Figure 2F:
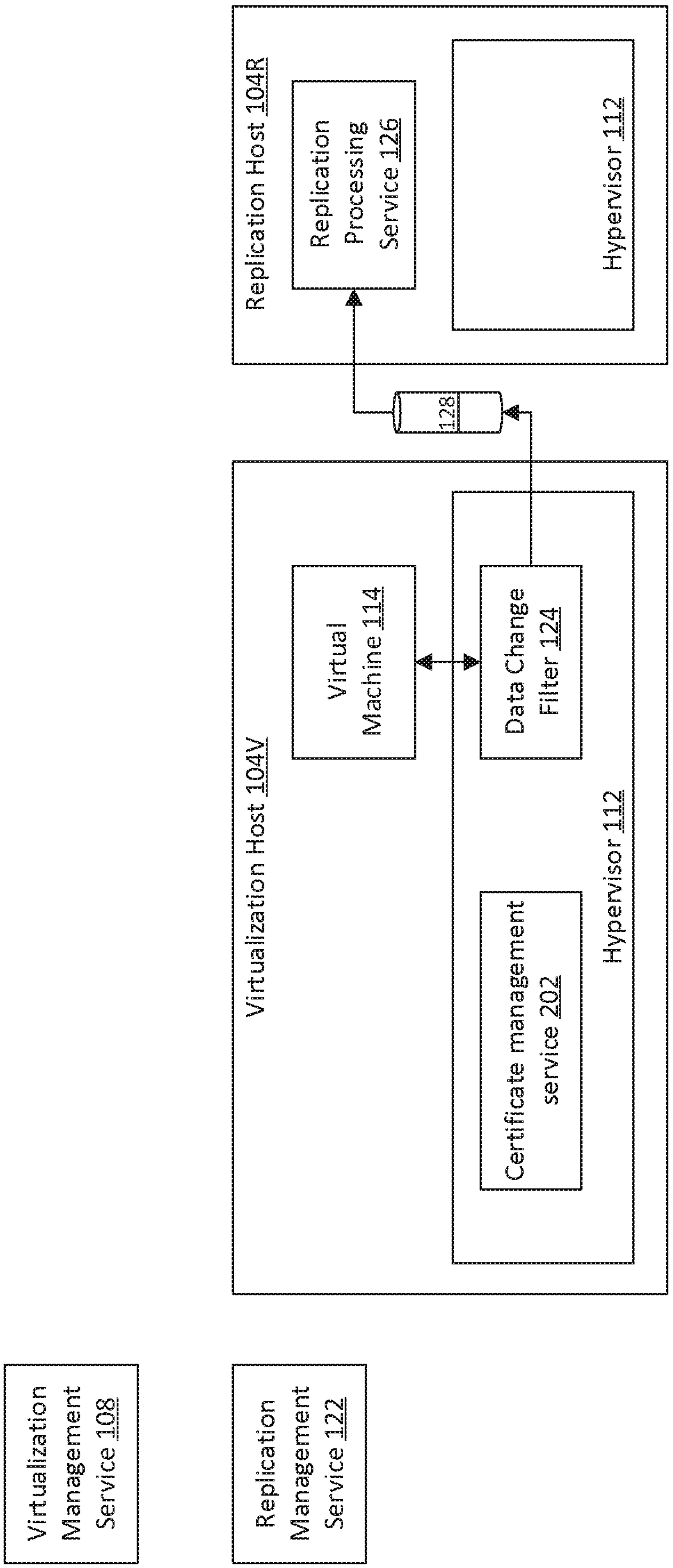

While FIGS. 2A-2E illustrate the data change filter 124 and the replication processing service 126 on the same host 104, other configurations may be implemented in different aspects of the system. In some implementations, as shown in FIG. 2F, the data change filter 124 and the replication processing service 126 may be deployed on separate hosts within the virtualized environment. Here, the certificate management service 202, data change filter 124, and virtual machine 114 execute on a virtualization host 104V, while the replication processing service 126 executes on a replication host 104R. In this case, the authenticated network connection 128 established between the data change filter 124 and the replication processing service 126 spans across the virtualization host 104V and the replication host 104R.

Figure 3:
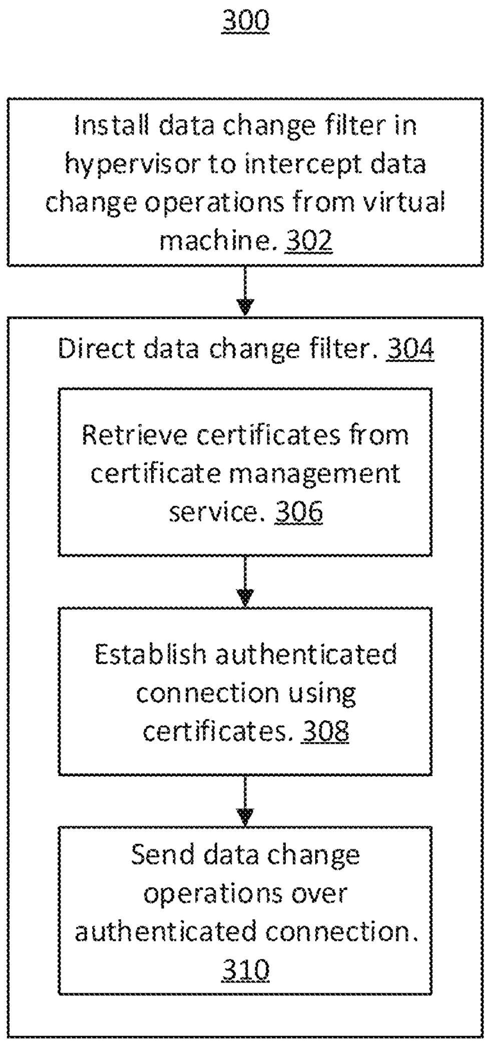
FIG. 3 is a flow diagram of a filter setup method, according to some implementations.

FIG. 3 is a flow diagram of a filter setup method 300, according to some implementations. The filter setup method 300 will be described in conjunction with the virtualized environment of FIGS. 2A-2F. The filter setup method 300 may be implemented by a management service. Specifically, the replication management service 122 may perform the filter setup method 300.

The replication management service 122 may perform a step 302 of installing a data change filter 124 in a hypervisor 112 of a virtualization host 104. The hypervisor 112 executes a virtual machine 114. The data change filter 124 intercepts data change operations from the virtual machine 114. The hypervisor 112 includes a certificate management service 202 that stores a private certificate for the data change filter 124 and a public certificate for a replication processing service 126.

The data change operations may include input/output operations for a virtual storage disk. Each of the input/output operations may include an offset of the virtual storage disk and binary data. The data change filter 124 may intercept the data change operations by asynchronously copying the input/output operations without blocking the input/output operations from proceeding to the virtual storage disk.

The replication management service 122 may perform a step 304 of directing the data change filter 124 to perform subsequent operations. This step may involve managing the data change filter 124, such as configuring it to execute specific tasks related to its setup.

The replication management service 122 may perform a step 306 of directing the data change filter 124 to retrieve the private certificate and the public certificate from the certificate management service 202. This may include directing the data change filter 124 to establish an inter-process communication channel between the data change filter 124 and the certificate management service 202 and transfer the certificates over the inter-process communication channel.

The replication management service 122 may perform a step 308 of directing the data change filter 124 to establish an authenticated network connection 128 with the replication processing service 126 using the private certificate and the public certificate. In some implementations, directing the data change filter 124 to establish the authenticated network connection 128 may include directing the data change filter 124 to encrypt requests to the replication processing service 126 using the private certificate and decrypt responses from the replication processing service 126 using the public certificate.

The replication management service 122 may perform a step 310 of directing the data change filter 124 to send the intercepted data change operations to the replication processing service 126 over the authenticated network connection 128.

In some implementations, the data change filter 124 is one of a plurality of data change filters 124 installed in the hypervisor 112. Each of the data change filters 124 may be directed to retrieve the private certificate and the public certificate from the certificate management service 202.

In some implementations, the replication management service 122 may also perform a step (not separately illustrated) of installing the certificate management service 202 in the hypervisor 112 of the virtualization host 104 and loading the private certificate and the public certificate into the certificate management service 202. Loading the private certificate and the public certificate into the certificate management service 202 may include directing the certificate management service 202 to store the private certificate and the public certificate in a file on the hypervisor 112. The certificate management service 202 may subsequently provide the private certificate and the public certificate from the file to the data change filter 124.

In some implementations, the virtualization host 104 is located at an active site 102A. The replication management service 122 may also perform a step (not separately illustrated) of directing the replication processing service 126 to replicate the data change operations to a backup site 102B.

Figure 4:
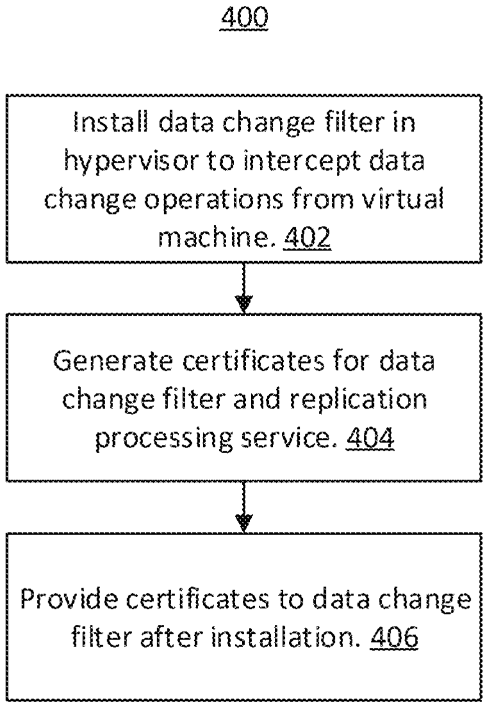
FIG. 4 is a flow diagram of a filter setup method, according to some implementations.

FIG. 4 is a flow diagram of a filter setup method 400, according to some implementations. The filter setup method 400 will be described in conjunction with the virtualized environment of FIGS. 2A-2F. The filter setup method 400 may be implemented by a management service. Specifically, the replication management service 122 may perform the filter setup method 400.

The replication management service 122 may perform a step 402 of installing a data change filter 124 in a hypervisor 112. The hypervisor 112 executes a virtual machine 114. The data change filter 124 intercepts data change operations from the virtual machine 114. The replication management service 122 may perform a step 404 of generating a first private certificate for the data change filter 124 and generating a first public certificate for a replication processing service 126. The replication management service 122 may perform a step 406 of providing the first private certificate and the first public certificate to the data change filter 124. This occurs after installing the data change filter 124 in the hypervisor 112, and may be accomplished by providing the certificates to a certificate management service 202, from which the data change filter 124 retrieves the certificates. In some implementations, the replication management service 122 may also perform a step (not separately illustrated) of generating a second public certificate for the data change filter 124 and a second private certificate for the replication processing service 126. In some implementations, the replication management service 122 may also perform a step (not separately illustrated) of providing the second private certificate and the second public certificate to the replication processing service 126.

The implementations described provide a flexible and secure approach to setting up data replication components in virtualized environments. By separating the installation of a data change filter from the configuration of its certificates, the system allows for easier updates and maintenance. The use of a certificate management service within a hypervisor enhances security by providing a trusted source for certificate distribution within the hypervisor. Additionally, the establishment of authenticated network connections between components ensures the integrity and confidentiality of data during replication.

In an example implementation of the disclosure, a method includes: installing a data change filter in a hypervisor of a virtualization host, the hypervisor executing a virtual machine, where the data change filter intercepts data change operations from the virtual machine, where the hypervisor includes a certificate management service that stores a private certificate for the data change filter and a public certificate for a replication processing service; and directing the data change filter to: retrieve the private certificate and the public certificate from the certificate management service; establish an authenticated network connection with the replication processing service using the private certificate and the public certificate; and send the data change operations to the replication processing service over the authenticated network connection.

In some implementations of the method, directing the data change filter to establish the authenticated network connection includes directing the data change filter to: encrypt requests to the replication processing service using the private certificate; and decrypt responses from the replication processing service using the public certificate. In some implementations of the method, the data change filter is one of a plurality of data change filters installed in the hypervisor, and each of the data change filters is directed to retrieve the private certificate and the public certificate from the certificate management service. In some implementations, the method further includes: installing the certificate management service in the hypervisor of the virtualization host; and loading the private certificate and the public certificate into the certificate management service. In some implementations of the method, loading the private certificate and the public certificate into the certificate management service includes directing the certificate management service to store the private certificate and the public certificate in a file on the hypervisor, and the certificate management service provides the private certificate and the public certificate from the file to the data change filter. In some implementations of the method, directing the data change filter to retrieve the private certificate and the public certificate includes directing the data change filter to: establish an inter-process communication channel between the data change filter and the certificate management service; and transfer the certificates over the inter-process communication channel. In some implementations of the method, the virtualization host is at an active site, and the method further includes: directing the replication processing service to replicate the data change operations to a backup site. In some implementations of the method, the data change operations include input/output operations for a virtual storage disk, and each of the input/output operations includes an offset of the virtual storage disk and binary data. In some implementations of the method, the data change operations include input/output operations for a virtual storage disk, and the data change filter intercepts the data change operations by asynchronously copying the input/output operations without blocking the input/output operations from proceeding to the virtual storage disk.

In an example implementation of the disclosure, a device includes: a processor; and a non-transitory computer readable medium storing instructions which, when executed by the processor, cause the processor to: install a data change filter in a hypervisor, where the hypervisor executes a virtual machine, where the data change filter intercepts data change operations from the virtual machine; generate a first private certificate for the data change filter and a first public certificate for a replication processing service; and provide the first private certificate and the first public certificate to the data change filter after installing the data change filter in the hypervisor.

In some implementations of the device, the instructions further cause the processor to: generate a second public certificate for the data change filter and a second private certificate for the replication processing service; and provide the second private certificate and second public certificate to the replication processing service.

In an example implementation of the disclosure, a system includes: a first replication host located at an active site; and a virtualization host located at the active site, the virtualization host including a hypervisor, the hypervisor including a certificate management service, the virtualization host configured to: install a first data change filter in the hypervisor, the first data change filter configured to intercept first data change operations from a first virtual machine executing on the hypervisor; provide a private certificate and a public certificate to the first data change filter from the certificate management service; establish an authenticated network connection with the first replication host using the private certificate and the public certificate; and send the first data change operations to the first replication host over the authenticated network connection.

In some implementations of the system, the virtualization host is configured to establish the authenticated network connection with the first replication host by asymmetrically encrypting communications with the first replication host. In some implementations of the system, the virtualization host is further configured to: install a second data change filter in the hypervisor, the second data change filter configured to intercept second data change operations from a second virtual machine executing on the hypervisor; and provide the private certificate and the public certificate to the second data change filter from the certificate management service. In some implementations, the system further includes: a management host configured to: install the certificate management service in the hypervisor of the virtualization host; and load the private certificate and the public certificate into the certificate management service. In some implementations of the system, the first data change filter includes a first process executing in the hypervisor, the certificate management service includes a second process executing in the hypervisor, and the virtualization host is configured to provide the private certificate and the public certificate to the first data change filter by sending the private certificate and the public certificate from the second process to the first process. In some implementations, the system further includes: a second replication host located at a backup site, the backup site different from the active site, where the first replication host is configured to replicate the first data change operations to the second replication host. In some implementations, the system further includes: a data store located at the backup site, where the second replication host is configured to journal the first data change operations on the data store. In some implementations of the system, the first replication host is virtual. In some implementations of the system, the first replication host is physical.

Although this disclosure describes or illustrates particular operations as occurring in a particular order, this disclosure contemplates the operations occurring in any suitable order. Moreover, this disclosure contemplates any suitable operations being repeated one or more times in any suitable order. Although this disclosure describes or illustrates particular operations as occurring in sequence, this disclosure contemplates any suitable operations occurring at substantially the same time, where appropriate. Any suitable operation or sequence of operations described or illustrated herein may be interrupted, suspended, or otherwise controlled by another process, such as an operating system or kernel, where appropriate. The acts can operate in an operating system environment or as stand-alone routines occupying all or a substantial part of the system processing.

While this disclosure has been described with reference to illustrative implementations, this description is not intended to be construed in a limiting sense. Various modifications and combinations of the illustrative implementations, as well as other implementations of the disclosure, will be apparent to persons skilled in the art upon reference to the description. It is therefore intended that the appended claims encompass any such modifications or implementations.

What is claimed is:

1. A method comprising:

installing a data change filter in a hypervisor of a virtualization host comprising a hardware processor, the hypervisor executing a virtual machine, wherein the data change filter intercepts data change operations from the virtual machine, and wherein the hypervisor comprises a certificate management service that stores a private certificate for the data change filter and a public certificate for a replication processing service;

directing the data change filter to retrieve the private certificate and the public certificate from the certificate management service by establishing an inter-process communication channel between the data change filter and the certificate management service, and transferring the private certificate and the public certificate over the inter-process communication channel;

establishing an authenticated network connection between the data change filter and the replication processing service using the private certificate and the public certificate; and sending, by the data change filter, the data change operations to the replication processing service over the authenticated network connection.

2. The method of claim 1, wherein the establishing of the authenticated network connection comprises:

encrypting, by the data change filter, requests to the replication processing service using the private certificate; and decrypting, by the data change filter, responses from the replication processing service using the public certificate.

3. The method of claim 1, wherein the data change filter is one of a plurality of data change filters installed in the hypervisor, and each data change filter of the plurality of data change filters retrieves the private certificate and the public certificate from the certificate management service.

4. The method of claim 1, further comprising:

installing the certificate management service in the hypervisor of the virtualization host; and loading the private certificate and the public certificate into the certificate management service.

5. The method of claim 4, wherein the loading of the private certificate and the public certificate into the certificate management service comprises storing the private certificate and the public certificate in a file on the hypervisor, and wherein the certificate management service provides the private certificate and the public certificate from the file to the data change filter.

6. The method of claim 1, wherein the private certificate comprises a first cryptographic key, and the public certificate comprises a second cryptographic key.

7. The method of claim 1, wherein the virtualization host is at an active site, and the method further comprises:

replicating, by the replication processing service, the data change operations to a backup site.

8. The method of claim 1, wherein the data change operations comprise input/output operations for a virtual storage disk, and each of the input/output operations comprises an offset of the virtual storage disk and data.

9. The method of claim 1, wherein the data change filter is installed in the hypervisor of the virtualization host without pre-configuring the data change filter with the private certificate and the public certificate.

10. The method of claim 1, comprising:

executing the certificate management service in a privileged domain of the hypervisor.

11. A system comprising:

a virtualization host comprising a hardware processor and a hypervisor, the hypervisor comprising a certificate management service, the virtualization host to:

install a first data change filter in the hypervisor, the first data change filter to intercept first data change operations from a first virtual machine executing on the hypervisor, wherein the first data change filter comprises a first process to execute in the hypervisor, and the certificate management service comprises a second process to execute in the hypervisor;

provide a private certificate and a public certificate to the first data change filter from the certificate management service by sending the private certificate and the public certificate from the second process to the first process;

establish an authenticated network connection between the virtualization host and a first replication host using the private certificate and the public certificate; and send the first data change operations to the first replication host over the authenticated network connection.

12. The system of claim 11, wherein the virtualization host is to establish the authenticated network connection with the first replication host by asymmetrically encrypting communications with the first replication host.

13. The system of claim 11, wherein the virtualization host is to further:

install a second data change filter in the hypervisor, the second data change filter to intercept second data change operations from a second virtual machine executing on the hypervisor; and provide the private certificate and the public certificate to the second data change filter from the certificate management service.

14. The system of claim 11, further comprising:

a management host to:

install the certificate management service in the hypervisor of the virtualization host; and load the private certificate and the public certificate into the certificate management service.

15. The system of claim 11, comprising:

the first replication host, wherein the virtualization host and the first replication host are located at an active site; and a second replication host located at a backup site, the backup site different from the active site, wherein the first replication host is to replicate the first data change operations to the second replication host.

16. The system of claim 11, wherein the certificate management service is executable in a privileged domain of the hypervisor.

17. The system of claim 11, wherein the private certificate comprises a first cryptographic key, and the public certificate comprises a second cryptographic key.

18. The system of claim 11, wherein the first data change filter is installed in the hypervisor of the virtualization host without pre-configuring the first data change filter with the private certificate and the public certificate.

19. A non-transitory machine-readable storage medium comprising instructions that upon execution cause a virtualization host comprising a hardware processor to:

install a data change filter in a hypervisor of the virtualization host, the hypervisor to execute a virtual machine, wherein the hypervisor comprises a certificate management service to store a private certificate for the data change filter and a public certificate for a replication processing service;

direct the data change filter to retrieve the private certificate and the public certificate from the certificate management service by establishing an inter-process communication channel between the data change filter and the certificate management service, and transferring the private certificate and the public certificate over the inter-process communication channel;

intercept, by the data change filter, data change operations from the virtual machine;

establish an authenticated network connection between the data change filter and the replication processing service using the private certificate and the public certificate; and send, by the data change filter, the data change operations to the replication processing service over the authenticated network connection.

20. The non-transitory machine-readable storage medium of claim 19, wherein the data change filter is installed in the hypervisor of the virtualization host without pre-configuring the data change filter with the private certificate and the public certificate.

* * * * *